Jan. 1, 1935.　　　　J. G. SISSON　　　　1,986,540
DIAL INDICATOR
Filed April 11, 1934
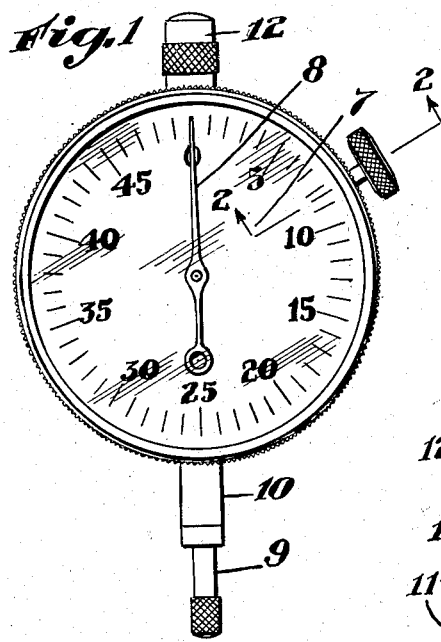
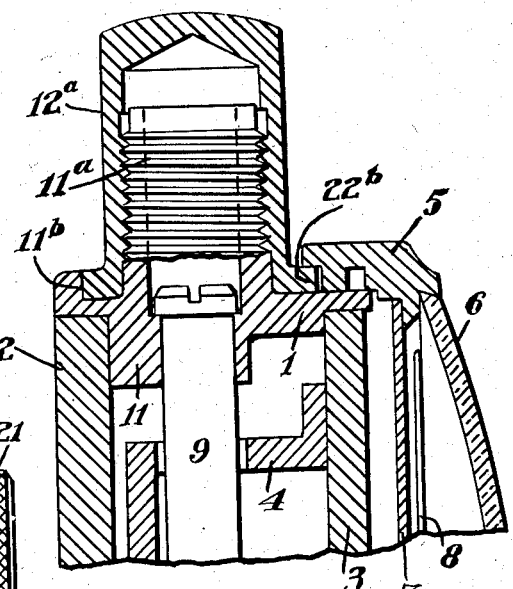
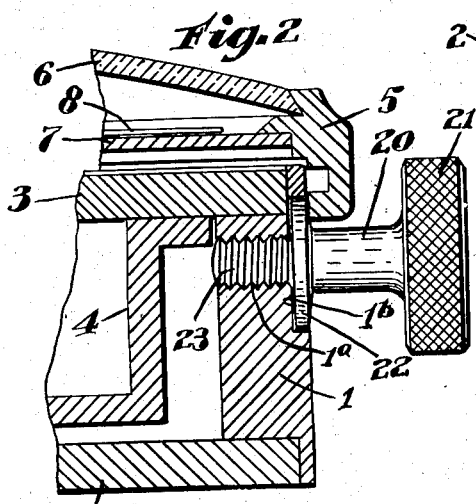
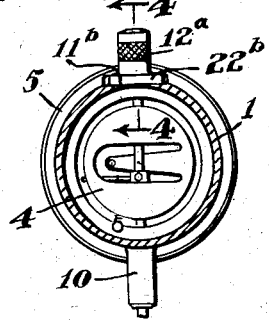
Inventor
James G. Sisson
By Ellis Spear Jr.
Attorney Patented Jan. 1, 1935

1,986,540

UNITED STATES PATENT OFFICE 1,986,540

DIAL INDICATOR

James G. Sisson, Athol, Mass., assignor to The L. S. Starrett Company, Athol, Mass., a corporation of Massachusetts Application April 11, 1934, Serial No. 720,092

10 Claims. (Cl. 116—129)

This invention relates to certain improvements in dial indicators and particularly those of the adjustable dial type. These indicators have enjoyed a just popularity for more than a quarter of a century and the present invention relates to specific improvements that bring these old indicators up to the requirements of late machinists' and manufacturers' conditions.

The old type of such indicator was rather crude. The advantage in shop practice, particularly in connection with heavy work, made it necessary that the dial indicator be so conceived, designed and actually manufactured that it will stand the vibration of machines speeded for production.

In the type of bezel lock shown herein the locking pressure is radially outward. In the form shown this offers several advantages as the locking pieces can be concealed or kept flush with the casing surface. They also do not tend to wear the outer or knurled surface of the bezel ring so that it is not necessary to make it of hard material and the knurlings can be as sharply faceted as desired, thus giving a firm grip to sweaty or oily fingers instead of having to grip the entire bezel to get a turning hold. Specifically, applicant provides for a direct radial pressure as distinguished from locks in which the pressures are of multiple components due to the leverages exerted.

The structure shown in the drawing indicates the improvements in the direction of efficiency in use and economy in production.

In the drawing is shown as much of such a dial gage as is herein involved, and in the drawing:

Fig. 1 is a face view of a dial gage in accordance with my invention.

Fig. 2 a section on the line 2—2 of Fig. 1, inconsequential interior parts being omitted.

Fig. 3 is a fragmentary view as seen from the rear showing the bezel lock applied at the usual dust cap bearing, and Fig. 4 is an enlarged section on the line 4—4, of Fig. 3, and particularly illustrating the adaptation of applicant's lock to the dust cap as a bezel locking means.

In the form shown in Figs. 1 and 2, the general type shown is that having opposite axial bearings for its spindle. In these figures the lock is disposed at one side of the casing with reference to this bearing axis.

The casing 1 is preferably a substantial tubular member affording a rigid cylindrical shell to which is applied the back 2 and the front plate 3. This plate 3 supports the bridge 4 so that the whole internal mechanism is rigidly supported. Those parts not necessary herein are not shown.

The tubular member or shell 1 which is of substantial thickness is drilled radially as at $1^a$ through its wall structure. The bore $1^a$ forms a bearing for the locking screw 20 for which it is tapped. This tapped bore is surrounded by a counterbore $1^b$.

The bezel ring 5 is rotatably mounted on the edge of the cylindrical casing 1 which it overlaps to intersect the counterbore $1^b$. The bezel carries the usual transparent cover 6 and dial 7 referable to the pointer 8. The pointer actuating spindle is indicated at 9 and is guided in a lower bearing 10 and an upper bearing 11 covered by a dust cap 12.

The gage is used and the dial adjusted in the usual manner in the measurement or checking of work, but my construction provides for a novel type of lock which is of practical assistance in these usual operations.

By reason of the rigidity of the casing and the overhang of the bezel, I am able to get strong radially outward acting lock structures in the gage which are of advantage in use and in manufacture.

One of these best illustrated in Fig. 2 consists of a screw lock piece 20 having a knurled head 21 below which is an annular flange 22. The inner end is threaded as at 23 to engage the left hand threads of the opening $1^a$. When in unlocked position the flange 22 fits flush or slightly within the counterbore $1^b$ and so clears the inside of the bezel ring which is free to turn.

When the dial is set and it is desired to lock it in any adjusted position, the knurled knob 21 is turned to the right and the lock piece 20 is backed outwardly. Upon this movement the flange 22 engages the inner edge of the ring 5 without marring any exposed part. I have referred to the left hand screw in this structure as of advantage. Most mechanics are used to turn their locks to the right to set or clamp the bezel. I therefore provide it for them in my structure by making the screw left handed.

In the form shown in Figs. 3 and 4, the dust cap $12^a$ common to this radial clamp type is made with a surrounding flange $22^b$. This is threaded on the upper bearing $11^a$ which is surrounded, as shown in Fig. 4, by a countersunk recess or lockway $11^b$. The bezel ring 5 is locked or unlocked by simply screwing up on or unscrewing the dust cap lock member $12^a$.

This cap member lock $12^a$ and the cooperating thread of the upper external spindle guide $11^a$ are preferably made left handed according to my concept to make practically possible the ready adoption and use by mechanics already habituated to a right hand twist of the locking means in tightening as above described.

What I therefore claim and desire to secure by Letters Patent is:—

1. In a dial gage, a cylindrical casing, a bezel mounted on one end of said casing and overlapping its outer surface, a bezel lock comprising a lock piece having a screw portion in engagement with said casing, and an intermediate flange on said lock piece disposed under the overhang of the bezel ring and movable radially outward to contact the inner surface of the bezel ring upon the unscrewing of the screw.

2. In a dial gage, a cylindrical casing, threaded lock receiving recess therein, a bezel mounted on one end of said casing and overlapping its outer surface, a bezel lock comprising a lock piece consisting of a threaded operating part for engagement with said casing, and a circular flange on said lock piece disposed under the overhang of the bezel ring and movable radially outward to contact the inner surface of the bezel ring upon the unscrewing of the screw, said casing having an annular counterbore surrounding said threaded recess and adapted to receive the lock piece flange.

3. In a dial gage, a casing, a bezel rotatably mounted thereon, and a rotatable locking piece consisting of a finger controlled head, a casing engaging shank and a circular flange about said shank and having its edge underlying said bezel, said shank and casing having a threaded engagement disposed and effective exclusively radially outward to clamp the bezel.

4. In a dial gage, a casing, a bezel rotatably mounted thereon, and a rotatable locking piece consisting of a finger controlled head, a casing engaging shank and a circular flange about said shank and having its edge underlying said bezel, said shank and casing having a threaded engagement and said casing being recessed in a position to receive the lock flange.

5. In a dial gage, a casing a bezel rotatably mounted thereon, and a rotatable locking piece consisting of a finger controlled head, a casing engaging shank and a circular flange about said shank and having its edge underlying said bezel, said shank and casing having a left hand threaded engagement whereby a right hand positive locking movement is maintained.

6. In a dial gage, a cylindrical casing having a spindle bearing projecting therefrom, a lock-piece threaded on said bearing, a flange on said lock-piece about the base of said bearing, a bezel rotatably mounted on one end of said casing and overlapping said flange, whereby said flange may be radially contacted with the inner surface of the bezel to lock it by rotation of the lock-piece.

7. In a dial gage, a cylindrical casing having diametrically disposed spindle bearings projecting therefrom, said casing having a lockway, a dust cap threaded on one of said bearings, a circular flange on said cap disposed in said lockway beneath the outer surface of said casing, a bezel rotatably mounted on one end of said casing and overlapping its outer surface and a portion of said flange, whereby said cap flange may be radially contacted with the inner surface of the bezel to lock it by rotation of the dust cap.

8. In a dial gage, a cylindrical casing having diametrically disposed spindle bearings projecting therefrom, said casing having an annular lockway surrounding one of said bearings, a dust cap threaded on one of said bearings, a circular flange on said cap disposed in said lockway beneath the outer surface of said casing, a bezel rotatably mounted on one end of said casing and overlapping its outer surface and a portion of said flange, whereby said cap flange may radially contact with the inner surface of the bezel to lock it by rotation of the dust cap.

9. In a dial gage, a cylindrical casing, a bezel mounted on one end of said casing and overlapping its outer surface, a bezel lock comprising a lock-piece having a threaded portion in engagement with said casing, and an annular flange on said lock-piece disposed under the overlap of the bezel and movable radially outward to contact the inner surface of the bezel upon unscrewing of the threaded lock-piece.

10. In a dial indicator, a casing having a spindle bearing projecting therefrom, a bezel rotatably mounted on one end of the casing, a lock-piece threaded on said bearing and having a portion engaging the bezel internally and movable with the lock-piece to stress the bezel exclusively radially outwardly and diametrically in the line of the bearing.

JAMES G. SISSON.